(12) United States Patent
Uchibori et al.

(10) Patent No.: US 11,193,460 B2
(45) Date of Patent: Dec. 7, 2021

(54) MULTI-CYLINDER ENGINE INTAKE STRUCTURE

(71) Applicant: YANMAR POWER TECHNOLOGY CO., LTD., Osaka (JP)

(72) Inventors: Masataka Uchibori, Osaka (JP); Makoto Shimono, Osaka (JP); Ai Iketani, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/768,182

(22) PCT Filed: Oct. 22, 2018

(86) PCT No.: PCT/JP2018/039238
§ 371 (c)(1),
(2) Date: May 29, 2020

(87) PCT Pub. No.: WO2019/130760
PCT Pub. Date: Jul. 4, 2019

(65) Prior Publication Data
US 2020/0318586 A1 Oct. 8, 2020

(30) Foreign Application Priority Data

Dec. 27, 2017 (JP) .............................. JP2017-250495

(51) Int. Cl.
*F02M 35/10* (2006.01)
*F02M 26/17* (2016.01)
(Continued)

(52) U.S. Cl.
CPC ..... *F02M 35/10222* (2013.01); *F02F 1/4235* (2013.01); *F02M 26/17* (2016.02);
(Continued)

(58) Field of Classification Search
CPC combination set(s) only.
See application file for complete search history.

(56) References Cited

U.S. PATENT DOCUMENTS

| 5,704,326 A | 1/1998 | Minegishi et al. |
| 6,032,634 A | 3/2000 | Minegishi et al. |
| (Continued) | | |

FOREIGN PATENT DOCUMENTS

| JP | 59-043665 U | 3/1984 |
| JP | 07-034984 A | 2/1995 |
| (Continued) | | |

OTHER PUBLICATIONS

International Search Report and Written Opinion for PCT Patent App. No. PCT/JP2018/039238 (Jan. 8, 2019) with English translation of the ISR.

*Primary Examiner* — Kevin A Lathers
(74) *Attorney, Agent, or Firm* — Cermak Nakajima & McGowan LLP; Tomoko Nakajima (57) ABSTRACT

This multi-cylinder engine intake structure is provided with a fresh air distribution chamber into which a plurality of fresh air distribution openings communicating with the individual intake ports are opened, and a gas collection chamber. The gas collection chamber includes a communication region into which a first communication opening communicating with the fresh air distribution chamber is opened, a first mixture region into which an air inlet and an EGR gas inlet are opened and which is positioned upstream of the communication region in a flow direction of a mixture gas of air and EGR gas, and a second mixture region positioned downstream of the communication region in the flow direction of the mixture gas.

7 Claims, 7 Drawing Sheets

(51) Int. Cl.
    *F02M 26/41*     (2016.01)
    *F02F 1/42*     (2006.01)
    *F02M 35/112*     (2006.01)

(52) U.S. Cl.
    CPC ...... *F02M 26/41* (2016.02); *F02M 35/10078* (2013.01); *F02M 35/112* (2013.01)

(56) References Cited

U.S. PATENT DOCUMENTS

| | | | |
|---|---|---|---|
| 8,919,315 B2 * | 12/2014 | Borghi | F02M 35/10262 123/184.21 |
| 2003/0230291 A1 | 12/2003 | Ko | |

FOREIGN PATENT DOCUMENTS

| | | |
|---|---|---|
| JP | 07-133725 A | 5/1995 |
| JP | 10-131812 A | 5/1998 |
| JP | 2004-019653 A | 1/2004 |
| JP | 2006-200475 A | 8/2006 |
| JP | 2006-233859 A | 9/2006 |
| JP | 2017-014953 A | 1/2017 |
| WO | WO2015/090492 A1 | 6/2015 |

* cited by examiner

MULTI-CYLINDER ENGINE INTAKE STRUCTURE

This application is a national phase entry under 35 U.S.C. § 371 of PCT Patent Application No. PCT/JP2018/039238, filed on Oct. 22, 2018, which claims priority under 35 U.S.C. § 119 to Japanese Patent Application No. 2017-250495, filed Dec. 27, 2017, both of which are incorporated by reference.

TECHNICAL FIELD

The present invention relates to a multi-cylinder engine intake structure in which exhaust gas is partially recirculated as EGR gas for fresh air taken into multiple cylinders.

BACKGROUND ART

Regarding a multi-cylinder engine that performs what is termed as EGR, in a case where EGR gas is not sufficiently diffused in fresh air, a variation or fluctuation occurs in EGR rates, which are recirculation ratios of EGR gas in fresh air, among the individual cylinders, which causes deterioration in exhaust emission, such as increase of NOx concentration in exhaust gas.

As a conventional multi-cylinder engine, one having a mechanism for facilitating diffusion of EGR gas in fresh air is known (for example, see Patent Literature 1). For example, in the multi-cylinder engine described in Patent Literature 1, along the outer peripheral part of a connection part of an air introduction pipe for introducing air, which is connected to an intake chamber, there is formed an exhaust distribution chamber for introducing EGR gas. Furthermore, along the periphery of the outlet of the air introduction pipe for the intake chamber, an ejection opening of the exhaust distribution chamber is open. In such a configuration, a backflow of EGR gas caused by a large pulsation of fresh air is prevented, and EGR gas is introduced into the intake chamber in such a manner that the EGR gas surrounds the introduced air, so that mixing of the air and the EGR gas is facilitated.

CITATION LIST

Patent Literature

Patent Literature 1: Japanese Unexamined Patent Application Publication No. H10-131812

DISCLOSURE OF INVENTION

Problems to be Solved by the Invention

In the multi-cylinder engine described in above-cited Patent Literature 1, air and EGR gas are respectively introduced and merged in the intake chamber having multiple fresh air distribution openings which communicate with the individual intake ports of multiple cylinders, so that mixture gas is generated. Therefore, even though the mixing thereof is facilitated, there is a possibility that mixture gas in an insufficiently-mixed state flows into the individual intake ports and is taken into the individual cylinders as fresh air. Furthermore, in such a multi-cylinder engine, the intake chamber is formed as a space inside an intake manifold mounted to a cylinder head, and, in the intake manifold, the exhaust distribution chamber is formed in the periphery of the connection part of the air introduction pipe connected to the intake chamber, which causes complexity of the structure of the intake manifold and increase in the cost.

In view of such a situation, the main problem of the present invention is to provide a technology, regarding a multi-cylinder engine that performs EGR, for distributing mixture gas with nearly uniformly diffused EGR gas to the individual intake ports so that the mixture gas is taken into the individual cylinders as fresh air, in order to suppress deterioration in exhaust emission caused by a variation in EGR rates, with adoption of a simple and rational configuration.

Means for Solving the Problems

The first characteristic configuration of the present invention is a multi-cylinder engine intake structure in which exhaust gas is partially recirculated as EGR gas for fresh air taken into multiple cylinders, and the multi-cylinder engine intake structure includes a fresh air distribution chamber in which a plurality of fresh air distribution openings are open, the plurality of fresh air distribution openings communicating with individual intake ports of the plurality of cylinders, and a gas collection chamber in which an air inlet for introducing the air, an EGR gas inlet for introducing the EGR gas, and a first communication opening that communicates with the fresh air distribution chamber are open, wherein the gas collection chamber includes a communication region in which the first communication opening is open, a first mixture region in which the air inlet and the EGR gas inlet are open, and a second mixture region, the first mixture region being located on an upstream side relative to the communication region along a flowing direction of mixture gas of the air and the EGR gas, the second mixture region being located on a downstream side relative to the communication region along the flowing direction of the mixture gas.

According to the present configuration, in the multi-cylinder engine that performs EGR, there is provided the gas collection chamber, which communicates with the fresh air distribution chamber via the first communication opening and into which air and EGR gas are introduced, in addition to the fresh air distribution chamber for distributing fresh air to the multiple fresh air distribution openings. That is, in the gas collection chamber, the EGR gas is made to merge with the air so as to generate mixture gas of the air and the EGR gas, and the mixture gas is introduced from the first communication opening into the fresh air distribution chamber, then the mixture gas is distributed to each fresh air distribution opening as fresh air and taken into each cylinder from each intake port.

Furthermore, on the upstream side along the flowing direction of the mixture gas in the gas collection chamber, there is provided the first mixture region in which the air inlet and the EGR gas inlet are open, and, on the downstream side relative to the first mixture region, there is provided the communication region in which the first communication opening is open, then, on the downstream side relative to the communication region, there is provided the second mixture region. Additionally, in the first mixture region located on the upstream side of the gas collection chamber, a flow of mixture gas directed toward the communication region is formed immediately after generation of the mixture gas. On the other hand, in the second mixture region located on the downstream side of the gas collection chamber, a flow of the mixture gas, which has passed through the communication region without flowing out from the first communication opening, returning and directed toward the communication region again is formed. Furthermore, in the communication region located at the central part of the gas collection chamber, the mixture gas that has arrived from the first mixture region and the mixture gas that has arrived from the second mixture region collide with each other.

In the above-described manner, in the second mixture region of the gas collection chamber, the mixing of the EGR gas with the air is facilitated with such a simple and rational configuration in which a flow of mixture gas is made to return. Furthermore, in the communication region of the gas collection chamber, the mixing of the EGR gas with the air is facilitated even more with such a simple and rational configuration in which mixture gases are made to collide with each other. Therefore, sufficiently-mixed mixture gas of air and EGR gas exists in the communication region of the gas collection chamber. Accordingly, sufficiently-mixed mixture gas can be introduced from the first communication opening into the fresh air distribution chamber, so as to be distributed to each intake port as fresh air and taken into each cylinder.

Therefore, according to the present invention, regarding a multi-cylinder engine that performs EGR, it is possible to provide a technology for distributing mixture gas with nearly uniformly diffused EGR gas to the individual intake ports so that the mixture gas is taken into the individual cylinders as fresh air, in order to suppress deterioration in exhaust emission caused by a variation in EGR rates, with adoption of a simple and rational configuration.

The second characteristic configuration of the present invention is that the fresh air distribution chamber is an internal space in a concave shape formed in a side surface part of a cylinder head, the gas collection chamber is an internal space of a collector mounted to the side surface part of the cylinder head, in a state so as to cover an opening part of the fresh air distribution chamber, and the multi-cylinder engine intake structure includes a separation plate in which the first communication opening is formed, the separation plate being intermediately mounted between the side surface part of the cylinder head and a mounting surface part of the collector to separate the fresh air distribution chamber and the gas collection chamber from each other.

According to the present configuration, since the fresh air distribution chamber is formed as an internal space in a concave shape in the side surface part of the cylinder head, it is possible to omit installation of an intake manifold separate from the cylinder head. Furthermore, by only mounting a collector in such a simple shape that does not require complex separate channels, unlike the above-described intake manifold, to the side surface part of the cylinder head in a state so as to cover the fresh air distribution chamber, it is possible to utilize the internal space of the collector as the gas collection chamber. Moreover, by only adopting such a simple configuration in which the separation plate including the first communication opening is intermediately mounted between the side surface part of the cylinder head and the mounting surface part of the collector, it is possible to preferably separate the fresh air distribution chamber on the cylinder head side and the gas collection chamber on the collector side from each other as well as allow the fresh air distribution chamber and the gas collection chamber to communicate with each other at the first communication opening. Additionally, by adopting such a configuration as described above, it is possible to easily change the size, shape, or the like, of the first communication opening formed in the separation plate, and, accordingly, it is possible to easily adjust the mixture situation of air and EGR gas in the gas collection chamber, as is preferred.

The third characteristic configuration of the present invention is that the fresh air distribution chamber is an internal space in a concave shape formed in a side surface part of a cylinder head, the gas collection chamber is an internal space of a collector mounted to the side surface part of the cylinder head, in a state so as to cover an opening part of the fresh air distribution chamber, a plurality of boss parts, to which bolts for mounting are inserted, are provided in a mounting part of the collector for the side surface part of the cylinder head, and outer peripheral parts of the plurality of boss parts are configured as convex parts formed on an inner wall surface of the gas collection chamber for facilitating mixing.

According to the present configuration, since the convex part for facilitating the mixing is formed on the inner wall surface of the gas collection chamber, in which EGR gas merges with air and mixture gas is generated, it is possible to further facilitate the mixing of the air and the EGR gas in the mixture gas with a turbulent flow, etc., generated by the mixture gas flowing along the convex part.

Furthermore, since the gas collection chamber is an internal space of the collector mounted in a state so as to cover the opening part of the fresh air distribution chamber, which is formed as an internal space in a concave shape in the side surface part of the cylinder head, it is possible to provide multiple boss parts, to which bolts for mounting are inserted, in the mounting part of the collector for the side surface part of the cylinder head, so as to utilize the outer peripheral parts of the boss parts as the convex parts for facilitating the mixing, which are to be formed on the inner wall surface of the gas collection chamber.

The fourth characteristic configuration of the present invention is to include a second communication opening formed to have a diameter smaller than the first communication opening and configured to allow the second mixture region of the gas collection chamber and the fresh air distribution chamber to communicate with each other.

According to the present configuration, since there is provided the second communication opening that allows the second mixture region of the gas collection chamber and the fresh air distribution chamber to communicate with each other, gas is exchanged between the second mixture region and the fresh air distribution chamber through the second communication opening, as appropriate. Therefore, in the gas collection chamber, it is possible to suppress generation of deposits caused by remaining of EGR gas in the second mixture region, in which a flow of the mixture gas that has passed through the communication region and has arrived from the first mixture region is made to return. Furthermore, since the size of the second communication opening, which allows the second mixture region to communicate with the fresh air distribution chamber, is formed to have a diameter smaller than the size of the first communication opening, which allows the communication region to communicate with the fresh air distribution chamber, it is possible that the mixture gas existing in the communication region, for which the mixing is sufficiently facilitated, is let flow from the first communication opening into the fresh air distribution chamber, and, in the meantime, insufficiently-mixed mixture gas existing in the second mixture region is prevented from flowing from the second mixture region into the fresh air distribution chamber.

The fifth characteristic configuration of the present invention is that the first mixture region is a region in which the mixture gas flows along a direction intersecting with a direction of a central axis of the first communication opening, and the second mixture region is a region located further in a back of the communication region along the flowing direction of the mixture gas in the first mixture region.

According to the present configuration, since the mixture gas flows from the first mixture region into the communication region, in which the first communication opening is open, along the direction intersecting with the direction of the central axis of the first communication opening in the gas collection chamber, it is possible that a large amount of the mixture gas that has flown from the first mixture region into the communication region is let preferably flow along the flowing direction of the mixture gas toward the second mixture region, which is further in the back of the communication region, without changing the flowing direction, so as to further facilitate the mixing of the air and the EGR gas in the mixture gas. Furthermore, since the mixture gas that flows from the first communication opening into the fresh air distribution chamber changes the flowing direction in the communication region of the gas collection chamber and passes through the first communication opening, the mixing can be facilitated in such a change of flowing directions.

The sixth characteristic configuration of the present invention is that the first mixture region is a region in which the EGR gas introduced from the EGR gas inlet flows along the flowing direction of the mixture gas and in which the fresh air introduced from the air inlet is merged with the flowing EGR gas along a direction intersecting with the flowing direction of the mixture gas.

According to the present configuration, in the first mixture region of the gas collection chamber, it is possible to make air merge with EGR gas flowing along the flowing direction of the mixture gas toward the communication region, in which the first communication opening is open, in a direction intersecting with the flowing direction of the EGR gas. That is, since the air and the EGR gas merge in directions intersecting with each other, the mixing thereof is facilitated. Furthermore, since air in a larger amount compared to the EGR gas flows into the gas collection chamber from the air inlet along the direction intersecting with the flowing direction of the EGR gas that flows toward the communication region, the air that has flown in collides with the inner wall of the gas collection chamber right after merging with the EGR gas, and, because of the turbulent flow generated by the collision, the mixing of the air and the EGR gas can be facilitated even more.

DESCRIPTION OF EMBODIMENTS

Based on FIG. 1 through FIG. 7, an explanation is given of embodiments of the multi-cylinder engine intake structure according to the present invention.

Figure 1:
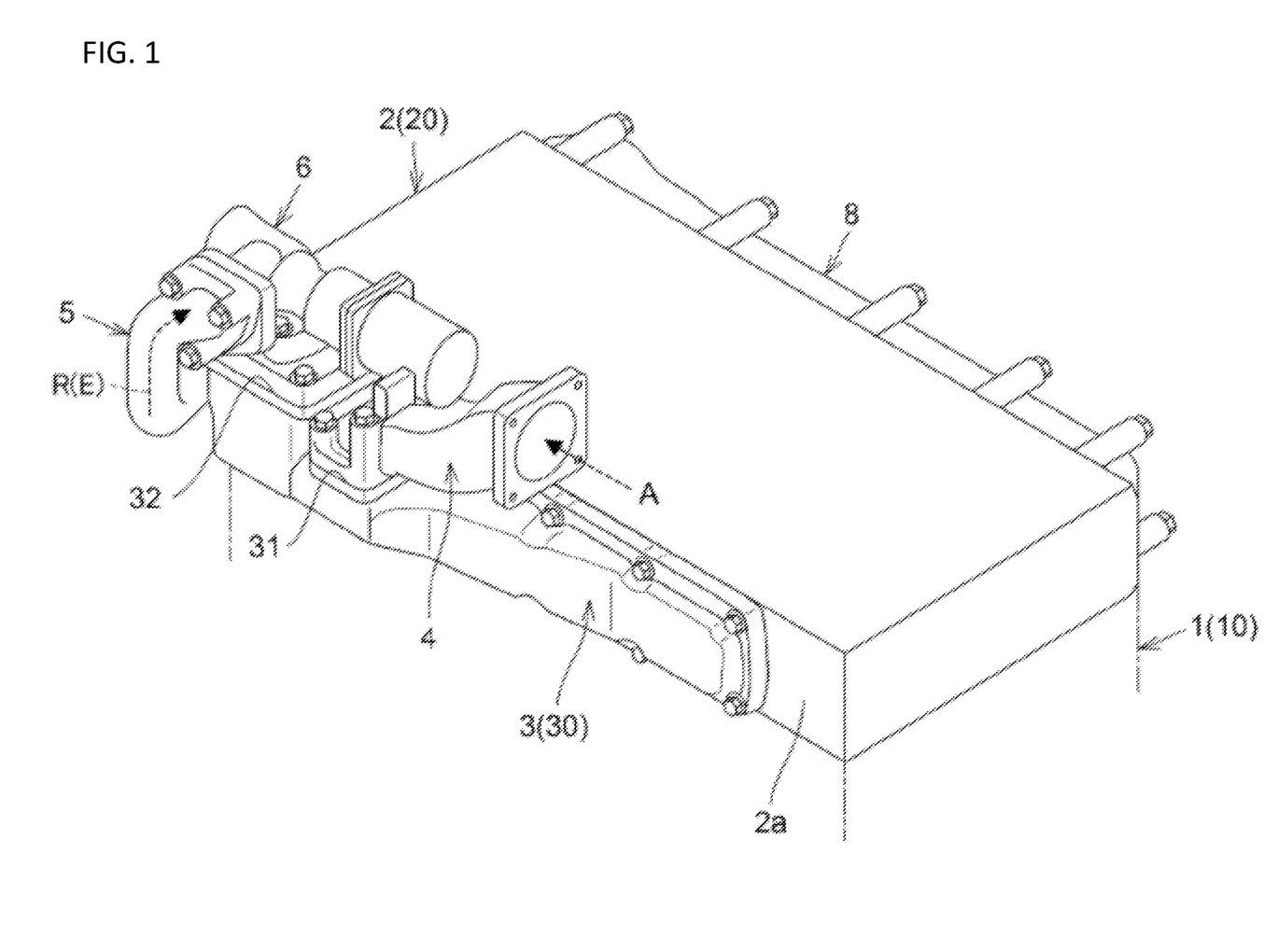
FIG. 1 is a perspective view of a cylinder head part of a multi-cylinder engine.
Figure 2:
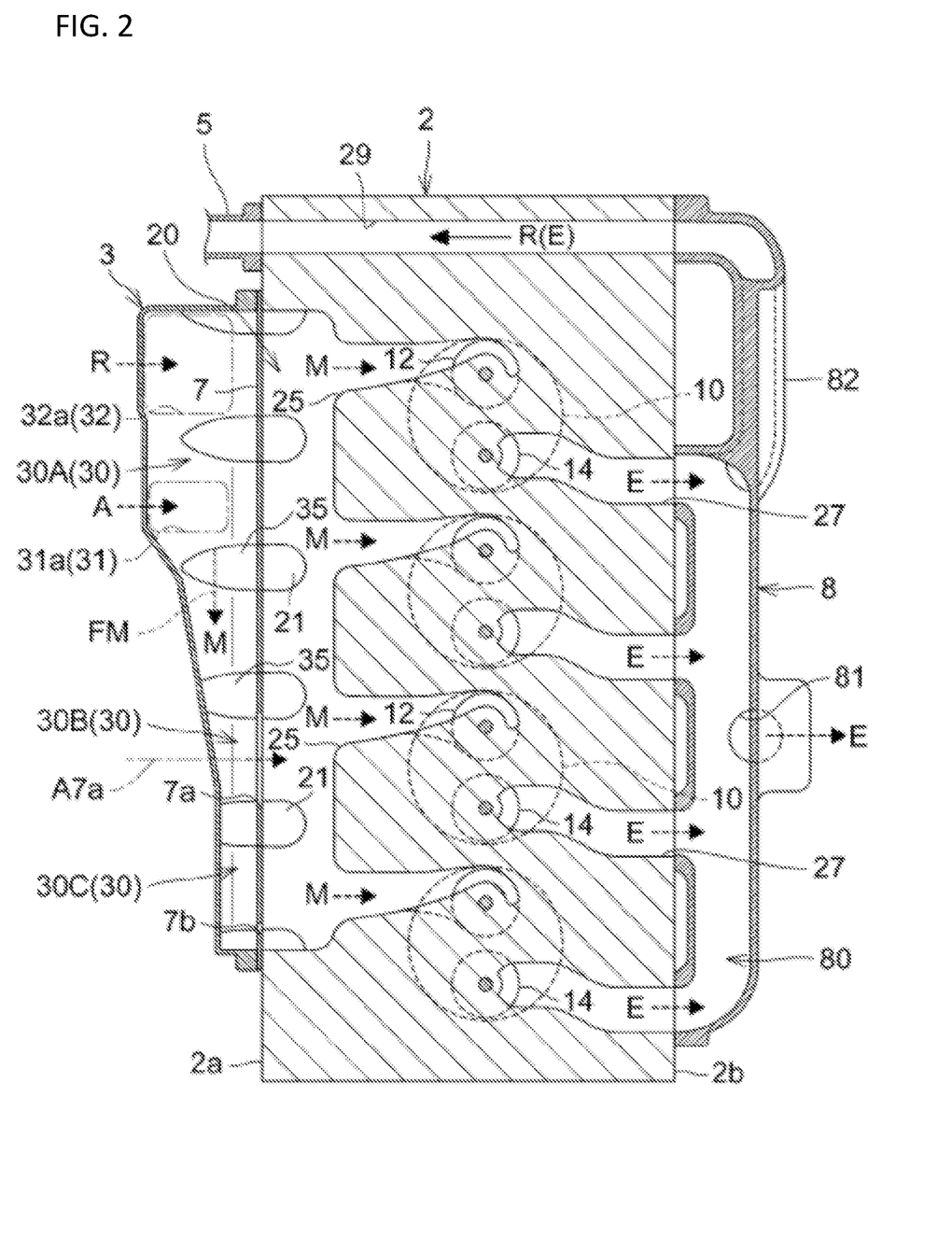
FIG. 2 is a planar cross-sectional view of the cylinder head part of the multi-cylinder engine.

The multi-cylinder engine of the present embodiments (hereinafter may be referred to as "the present engine" for short) is configured as an inline-four diesel engine including an engine body 1 provided with four serially-aligned cylinders 10, as illustrated in FIG. 1 and FIG. 2. Furthermore, the present engine is configured to perform EGR, in which exhaust gas E is partially recirculated as EGR gas R for fresh air taken into each cylinder 10.

On the top surface part of the engine body 1, there is provided a cylinder head 2. As mainly illustrated in FIG. 2, in a side surface part 2a of the cylinder head 2 on one side, there is formed a fresh air distribution chamber 20, which is an internal space in a concave shape extending along the direction in which the multiple cylinders 10 are aligned in plan view (hereinafter referred to as "the cylinder alignment direction"). Furthermore, in the fresh air distribution chamber 20, four fresh air distribution openings 25 that communicate with the individual intake ports 12 of the four cylinders 10 are provided in a state so as to open outward. Since the fresh air distribution chamber 20 is formed as the internal space of the cylinder head 2 in this way, installation of an intake manifold separate from the cylinder head 2 is omitted.

To the side surface part 2a of the cylinder head 2, which is on the side where the fresh air distribution chamber 20 is formed, there is mounted a collector 3 in a state so as to cover the opening part of the fresh air distribution chamber 20. Inside the collector 3, there is formed a gas collection chamber 30. That is, unlike an intake manifold which internally includes complex separate channels, the collector 3 is configured to have a simple shape in which the gas collection chamber 30 is formed as a concave space that opens toward a surface of the cylinder head 2.

On the other hand, in the side surface part 2b, which is on the other side of the cylinder head 2, there are formed four exhaust outflow openings 27 that communicate with the individual exhaust ports 14 of the multiple cylinders 10. To the side surface part 2b of the cylinder head 2, which is on the side where the exhaust outflow openings 27 are formed, there is mounted an exhaust manifold 8 in a state so as to be connected to the exhaust outflow openings 27. Inside the exhaust manifold 8, there is formed an exhaust gas gathering chamber 80 extending along the cylinder alignment direction.

In addition, as illustrated in FIG. 2, in this type of multi-cylinder engine, the air A and the EGR gas R are introduced into the gas collection chamber 30 inside the collector 3 and merge with each other, so that the mixture gas M of the air A and the EGR gas R is generated in the gas collection chamber 30. The mixture gas M flows into the fresh air distribution chamber 20 inside the cylinder head 2, so as to be distributed to each fresh air distribution opening 25 as fresh air and taken into each cylinder 10 through each intake port 12.

On the other hand, the exhaust gas E discharged from each cylinder 10 through each exhaust port 14 is introduced from each exhaust outflow opening 27 into the exhaust gas gathering chamber 80 inside the exhaust manifold 8. The exhaust gas E introduced into the exhaust gas gathering chamber 80 is mostly conveyed to an exhaust gas processing part (not illustrated in the drawings) from the exhaust gas discharging opening 81 that opens to the exhaust gas gathering chamber 80, so as to be released to the atmosphere after an appropriate detoxification process is performed. Furthermore, a part of the exhaust gas E introduced into the exhaust gas gathering chamber 80 is retrieved as EGR gas R into the EGR gas pipe line 29 through the EGR gas retrieving pipe section 82 provided in the exhaust manifold 8. The retrieved EGR gas R is introduced into the gas collection chamber 30 inside the collector 3 through the EGR gas introduction pipe 5 and the EGR control valve 6 (see FIG. 1 and FIG. 3).

To the present engine, a simple and rational air supply structure is adopted. By adopting such an air supply structure, it is possible that mixture gas M with nearly uniformly diffused EGR gas R is distributed to each intake port 12 as fresh air and taken into each cylinder 10, so as to suppress deterioration in exhaust emission caused by a variation in EGR rates. Details of the intake structure are additionally explained below.

Figure 4:
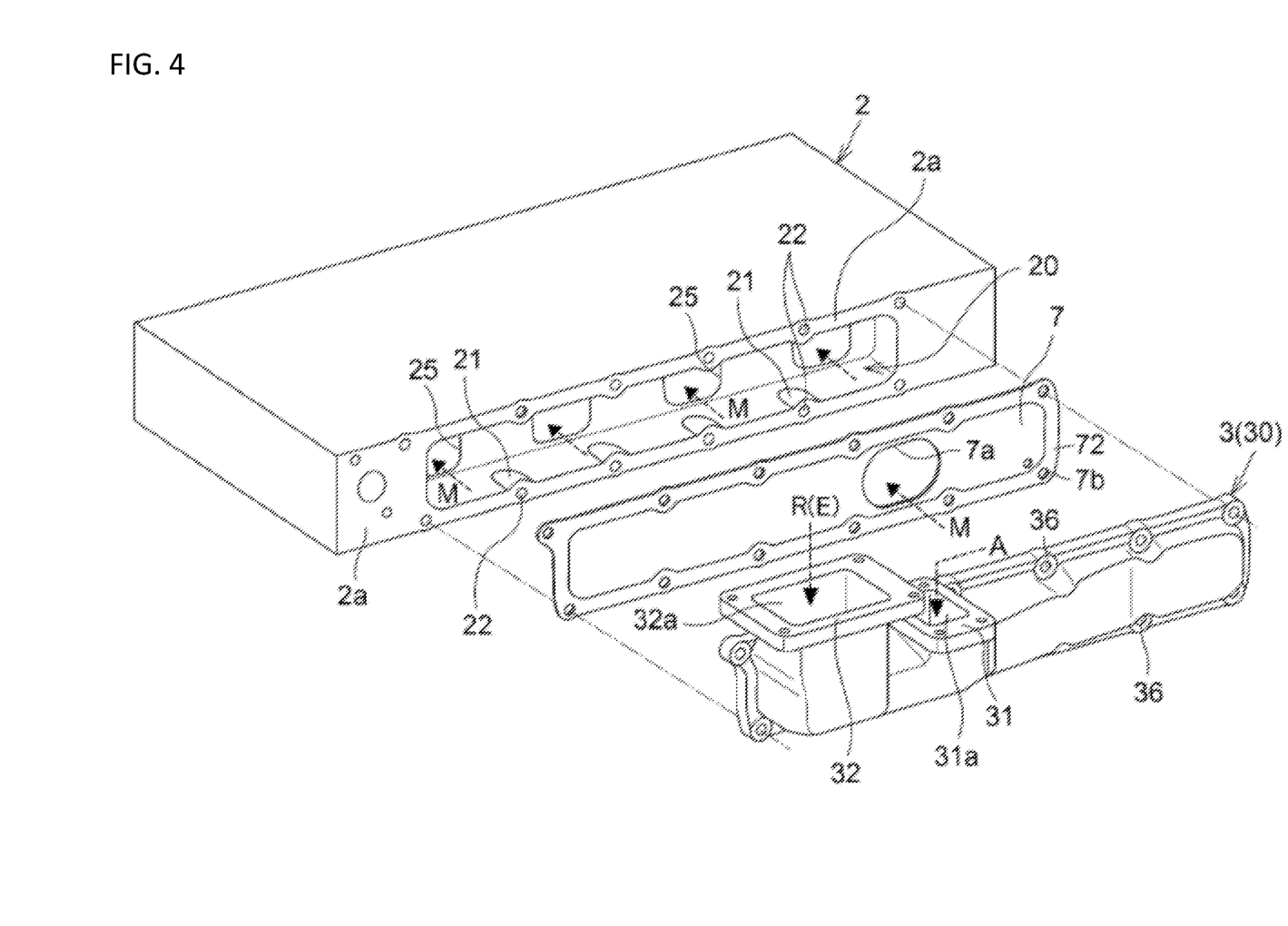
FIG. 4 is an exploded perspective view of the intake structure part of the multi-cylinder engine.
Figure 5:
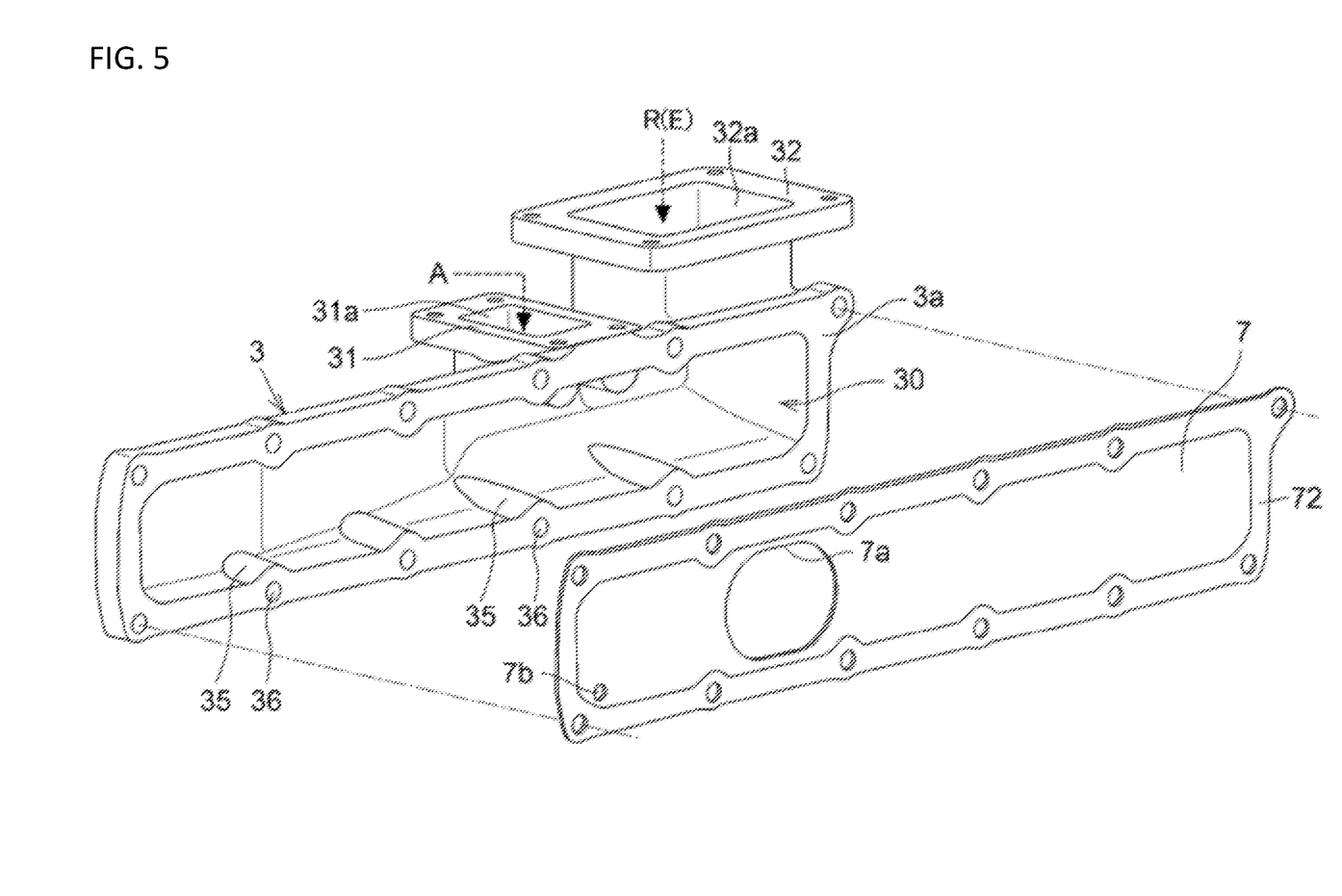
FIG. 5 is a perspective view illustrating an exploded state of a collector and a separation plate.
Figure 6:
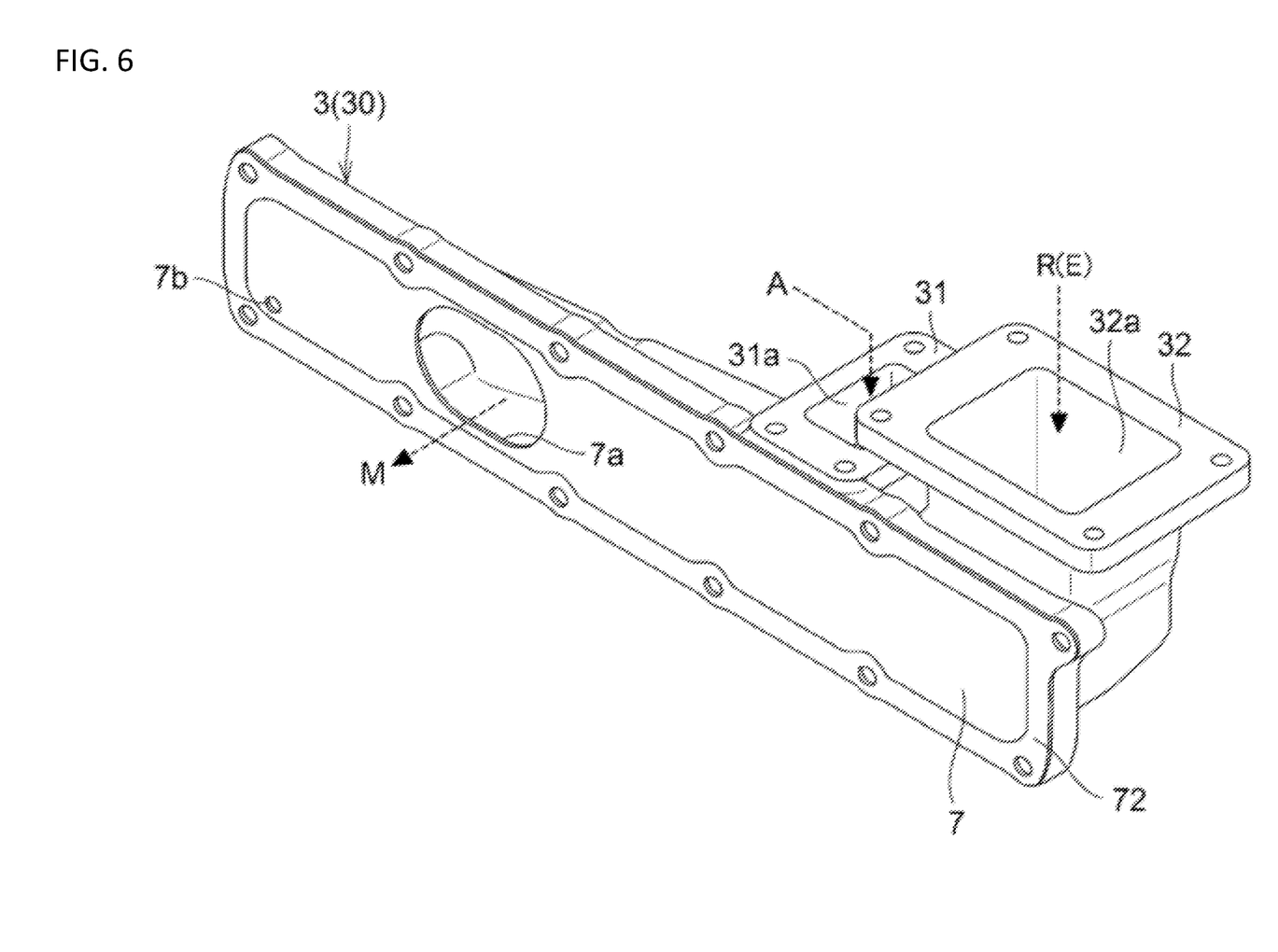
FIG. 6 is a perspective view illustrating an assembled state of the collector and the separation plate.

As illustrated in FIG. 4 and FIG. 5, between the mounting surface part 3a of the collector 3 and the side surface part 2a of the cylinder head 2 on the side where the fresh air distribution chamber 20 is formed, there is an intermediately-mounted separation plate 7, which is made of a steel plate. In the separation plate 7, there are formed a first communication opening 7a and a second communication opening 7b, which has a diameter smaller than the first communication opening 7a. That is, the fresh air distribution chamber 20, which is formed as an internal space of the cylinder head 2, and the gas collection chamber 30, which is formed as an internal space of the collector 3, are separated from each other by the separation plate 7 while communicating with each other through the first communication opening 7a and the second communication opening 7b.

Note that, regarding the separation plate 7, it is possible to change the sizes, shapes, numbers, formation positions, etc., of the first communication opening 7a and the second communication opening 7b, as appropriate. By changing these, it is possible to easily adjust the mixture state of air A and EGR gas R in the gas collection chamber 30 as is preferred.

Furthermore, between the outer peripheral edge part of the separation plate 7 and the side surface part 2a of the cylinder head 2 as well as the mounting surface part 3a of the collector 3, there is a gasket 72 mounted intermediately. Note that, in a case where the separation plate 7 is configured of such a material that functions as a gasket, addition of a separate gasket 72 can be omitted.

As illustrated in FIG. 2, the fresh air distribution chamber 20, which is formed as an internal space of the cylinder head 2, is formed as a space extending along the cylinder alignment direction. Therefore, the mixture gas M introduced in the direction orthogonal to the cylinder alignment direction from the first communication opening 7a formed in the separation plate 7 changes the flowing direction to a direction along the cylinder alignment direction, so as to be distributed to each fresh air distribution opening 25.

Figure 3:
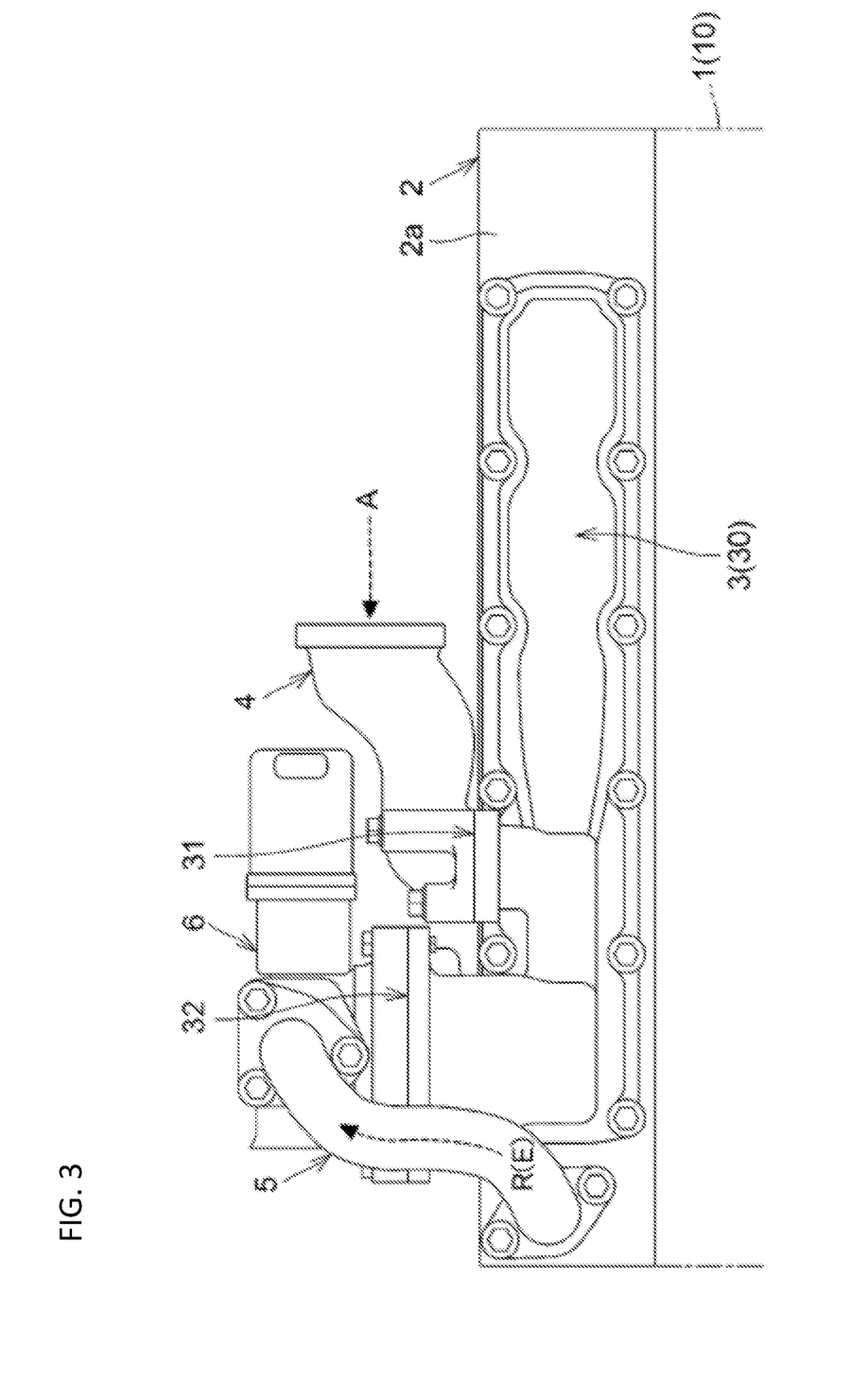
FIG. 3 is a side view of an intake structure part of the multi-cylinder engine.

As illustrated in FIG. 1 and FIG. 3, on the top surface part of the collector 3, there are provided a connection part 31 to which the air introduction pipe 4 is connected and a connection part 32 to which the EGR control valve 6 is connected. Furthermore, as mainly illustrated in FIG. 5 and FIG. 7, in the ceiling surface part of the gas collection chamber 30, which is formed as an internal space of the collector 3, there are openings of an air inlet 31a, through which air A is introduced from the air introduction pipe 4, and an EGR gas inlet 32a, through which EGR gas R is introduced from the EGR gas introduction pipe 5. The air inlet 31a and the EGR gas inlet 32a are both openings for introducing air A and EGR gas R vertically downward.

As illustrated in FIG. 2, the gas collection chamber 30, which is formed as an internal space of the collector 3, is adjacent to the outer side of the fresh air distribution chamber 20 inside the cylinder head 2, and the gas collection chamber 30 is formed as a space extending along the cylinder alignment direction as with the fresh air distribution chamber 20. That is, in the gas collection chamber 30, air A and EGR gas R are introduced vertically downward from the air inlet 31a and the EGR gas inlet 32a, respectively. Furthermore, the introduced air A and EGR gas R collide with the bottom surface part of the gas collection chamber 30 and change the flowing directions to a direction (the direction indicated by the reference sign FM in FIG. 2) along the cylinder alignment direction, so as to flow through the gas collection chamber 30.

Figure 7:
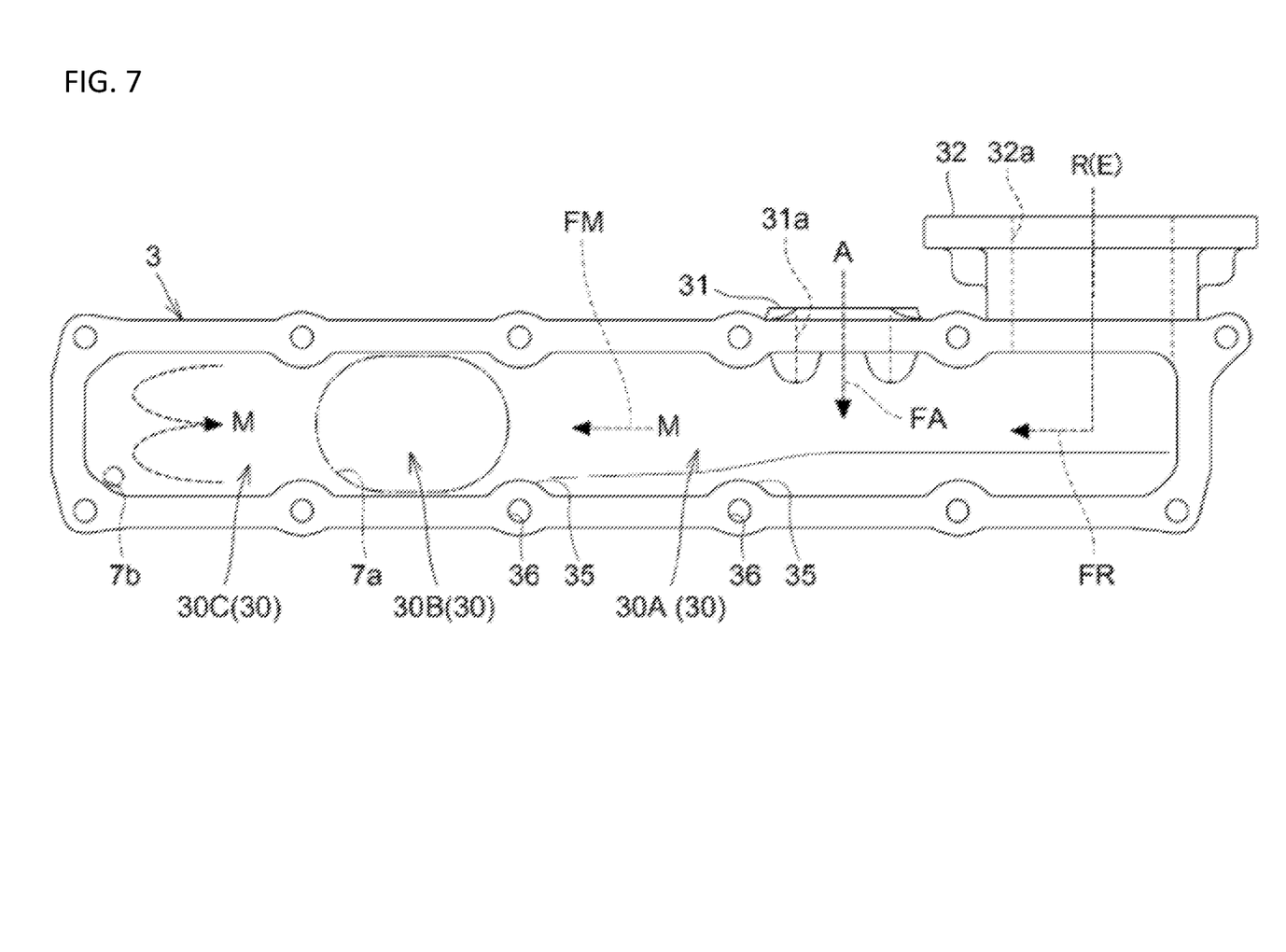
FIG. 7 is a side view of an opening part side of the collector.

As illustrated in FIG. 7, in the collector 3, the EGR gas inlet 32a is an opening adjacent to an end part on a side of the gas collection chamber 30 along the cylinder alignment direction. Furthermore, in the collector 3, the air inlet 31a is an opening adjacent to a further central part along the cylinder alignment direction, relative to the EGR gas inlet 32a. That is, the EGR gas R introduced vertically downward from the EGR gas inlet 32a changes the flowing direction to a direction (the direction indicated by the reference sign FR in FIG. 7) along the cylinder alignment direction and flows in the gas collection chamber 30. Moreover, the introduced air A is merged with the EGR gas R, which flows along the cylinder alignment direction, from the air inlet 31a in the vertically downward direction (the direction indicated by the reference sign FA in FIG. 7), so that mixture gas M is generated. Then, the mixture gas M flows along the cylinder alignment direction (the direction indicated by the reference sign FM in FIG. 7).

As illustrated in FIG. 2, the first communication opening 7a, which allows the gas collection chamber 30 inside the collector 3 and the fresh air distribution chamber 20 inside the cylinder head 2 to communicate with each other, is provided in the separation plate 7 that is parallel to the cylinder alignment direction in plan view. Therefore, the flowing direction of the mixture gas M in the gas collection chamber 30 is a direction along the cylinder alignment direction, which is orthogonal to the direction of the central axis A1a of the first communication opening 7a.

As illustrated in FIG. 2 and FIG. 7, the gas collection chamber 30 inside the collector 3 includes the communication region 30B, the first mixture region 30A, and the second mixture region 30C. The communication region 30B is open through the first communication opening 7a of the separation plate 7. The first mixture region 30A is open through the air inlet 31a and the EGR gas inlet 32a and is located on the upstream side relative to the communication region 30B along the flowing direction FM of the mixture gas M. Furthermore, the second mixture region 30C is located on the downstream side relative to the communication region 30B along the flowing direction FM of the mixture gas M. That is, in the gas collection chamber 30, the first mixture region 30A, the communication region 30B, and the second mixture region 30C are provided in that order from the upstream side along the flowing direction FM of the mixture gas M.

In the first mixture region 30A, which is located on the most upstream side of the gas collection chamber 30, the EGR gas R introduced from the EGR gas inlet 32a flows along the cylinder alignment direction, which is the flowing direction FM of the mixture gas M. Moreover, the air A introduced from the air inlet 31a merges with the flowing EGR gas R in the vertically downward direction FA that intersects with the cylinder alignment direction, which is the flowing direction FM of the mixture gas M, so that mixture gas M is generated. Furthermore, upon generation, the mixture gas M flows toward the communication region 30B along the flowing direction FM, which is the cylinder alignment direction that intersects at a nearly right angle to the direction of the central axis A1a of the first communication opening 7a.

That is, since the air A and the EGR gas R merge in directions intersecting with each other, the mixing thereof is facilitated. Furthermore, the air A in a larger amount compared to the EGR gas R flows into the gas collection chamber 30 from the air inlet 31a along the direction FA intersecting with the flowing direction FM of the EGR gas R, which flows toward the communication region 30B, and merges with the EGR gas R. Therefore, the air A that has flown in collides with the inner wall of the gas collection chamber 30 right after merging with the EGR gas R, and, because of the turbulent flow generated by the collision, the mixing of the air A and the EGR gas R is facilitated even more.

Note that, in the first mixture region 30A, since the amount of introduced air A is larger than the amount of introduced EGR gas R, the EGR gas R is blown up to the vicinity of the ceiling part. Accordingly, an upper part of the mixture gas M flowing toward the communication region 30B has a higher concentration of EGR gas R.

In the communication region 30B, which is located at the central part of the gas collection chamber 30, there is provided the first communication opening 7a in the separation plate 7, which is parallel to the cylinder alignment direction in plan view. Accordingly, a part of the mixture gas M arrives from the first mixture region 30A along the flowing direction FM, which is the cylinder alignment direction. A part of the mixture gas M that has arrived there passes through the communication region 30B without flowing out into the fresh air distribution chamber 20 through the first communication opening 7a, which has the central axis A1a in the direction orthogonal to the flow of the mixture gas M, and flows toward the second mixture region 30C.

Furthermore, as described above, an upper part of the mixture gas M that has arrived in the communication region 30B from the first mixture region 30A has a higher concentration of EGR gas R. Therefore, in order to actively convey the EGR gas R in the mixture gas M into the second mixture region 30C, the first communication opening 7a may be provided on a lower side. Moreover, by providing the first communication opening 7a on a lower side, generation of deposits caused by remaining of EGR gas R near the bottom part is preferably suppressed.

The mixture gas M that has passed the communication region 30B arrives in the second mixture region 30C, which is located on the most downstream side of the gas collection chamber 30, and a flow of the mixture gas M returning toward the communication region 30B is formed. Therefore, in the communication region 30B, there is collision of the mixture gas M that has arrived from the first mixture region 30A and the mixture gas M that has arrived from the second mixture region 30C, so that the mixture gases M that have collided with each other flow out from the first communication opening 7a into the fresh air distribution chamber 20.

Since such a flow of mixture gas M as described above is formed in the gas collection chamber 30, the mixing of the EGR gas R with the air A is facilitated in the second mixture region 30C of the gas collection chamber 30 with such a simple and rational configuration in which a flow of mixture gas M returns. Furthermore, in the communication region 30B of the gas collection chamber 30, the mixing of the EGR gas R with the air A is facilitated even more with such a simple and rational configuration in which mixture gases M are made to collide with each other. Therefore, sufficiently-mixed mixture gas M of air A and EGR gas R exists in the communication region 30B of the gas collection chamber 30. Accordingly, the sufficiently-mixed mixture gas M flows into the fresh air distribution chamber 20 from the first communication opening 7a of the separation plate 7, so as to be distributed to each intake port 12 as fresh air and taken into each cylinder 10.

The second mixture region 30C is a region located further in the back of the communication region 30B along the cylinder alignment direction, which is the flowing direction FM of the mixture gas M in the first mixture region 30A. Therefore, in the gas collection chamber 30, the mixture gas M that has flown from the first mixture region 30A along the flowing direction FM, which is the cylinder alignment direction, and has arrived in the communication region 30B does not change the flowing direction, so that the mixture gas M can be preferably directed toward the second mixture region 30C. Accordingly, the mixture gas M flows into the second mixture region 30C as much as possible, so that the mixing of the air A and the EGR gas R in the mixture gas M is further facilitated.

Furthermore, in the communication region 30B, the mixture gas M nearly orthogonally changes the flowing direction and flows out into the fresh air distribution chamber 20 through the first communication opening 7a. In such a change of flowing directions, the mixing of the mixture gas M is facilitated as well.

Note that, in the present embodiment, the shape of the first communication opening 7a is a long hole shape in order to increase a flowing area as much as possible and generate a uniform flow, although the shape of the first communication opening 7a may be set as appropriate, such as a circle, an ellipse, or a rectangle. Accordingly, it is possible to create a uniform flow while decreasing the flow rate of the mixture gas M flowing into the fresh air distribution chamber 20 through the first communication opening 7a, so that, in the fresh air distribution chamber 20, a drift of mixture gas M into each fresh air distribution opening 25 is prevented.

In the outer peripheral edge part of the opening part of the fresh air distribution chamber 20, which is in the side surface part 2a of the cylinder head 2, and in the outer peripheral edge part of the opening part of the gas collection chamber 30, which is in the mounting surface part 3a of the collector 3, there are provided multiple boss parts 22 and 36. With the multiple boss parts 22 and 36, the cylinder head 2 and the collector 3 are connected. Furthermore, the outer peripheral parts of the multiple boss parts 22 and 36 are formed as convex parts 21 and 35, which protrude inward from the bottom surfaces and the ceiling surfaces of the individual inner wall surfaces of the fresh air distribution chamber 20 and the gas collection chamber 30 for facilitating the mixing. That is, in the gas collection chamber 30 and the fresh air distribution chamber 20, the mixture gas M flows along the cylinder alignment direction between the bottom parts and the ceiling parts on which the multiple convex parts 21 and 35 are formed. Accordingly, a turbulent flow is generated in the vicinity of the convex parts 21 and 35 by flowing of the mixture gas M, so that the mixing of the air A and the EGR gas R in the mixture gas M is facilitated because of the turbulent flow.

Since the flow of the mixture gas M that has passed the communication region 30B and arrived from the first mixture region 30A is made to return in the second mixture region 30C of the gas collection chamber 30, the EGR gas R tends to remain in the vicinity of the bottom part, etc., and, in that state, it is likely that deposits will be generated because of it. Therefore, for example, in a lower part of the section facing the second mixture region 30C in the separation plate 7, the second communication opening 7b having a diameter smaller than the first communication opening 7a is open, so that the second mixture region 30C and the fresh air distribution chamber 20 communicate with each other through the second communication opening 7b. That is, since the second mixture region 30C and the fresh air distribution chamber 20 communicate with each other through the second communication opening 7b with a small diameter, gas is exchanged between the second mixture region 30C and the fresh air distribution chamber 20 through the second communication opening 7b, as appropriate. Accordingly, remaining of the EGR gas R in the second mixture region 30C is suppressed, and generation of deposits is preferably prevented. Furthermore, since the second communication opening 7b has a diameter smaller than the first communication opening 7a, insufficiently-mixed mixture gas M existing in the second mixture region 30C is preferably prevented from flowing from the second communication opening 7b into the fresh air distribution chamber 20.

Other Embodiments

Explanations are given of other embodiments of the present invention. Note that the configuration of each embodiment explained below can be applied not only independently but also in combination with the configuration of another embodiment.

(1) Although the present engine is configured as an inline-four diesel engine in the above-described embodiment, it is possible to change the number, the arrangement, the type of fuel, and the like, of cylinders, as appropriate.

(2) In the above-described embodiment, the fresh air distribution chamber 20 is formed as an internal space of the cylinder head 2 and is provided with multiple fresh air distribution openings 25 communicating with the individual intake ports 12, so that installation of an intake manifold is omitted. However, there may be a configuration in which multiple fresh air distribution openings are formed in the side surface part 2a of the cylinder head 2, so that an intake manifold is mounted in a state so as to be connected to the fresh air distribution openings.

(3) In the above-described embodiment, the collector 3 is mounted to the side surface part 2a, which is on the side where the fresh air distribution chamber 20 of the cylinder head 2 is formed, with intermediation of the separation plate 7 in which the first communication opening 7a, etc., is formed, so that the gas collection chamber 30 that communicates with the fresh air distribution chamber 20 via the first communication opening 7a is formed inside the collector 3. However, the configurations of the first communication opening 7a and the gas collection chamber 30 may be changed as appropriate. For example, the gas collection chamber may be positioned in a distance from the fresh air distribution chamber, and the gas collection chamber and the fresh air distribution chamber may be connected through a communication pipe, so that a connection opening of the communication pipe toward the gas collection chamber functions as the first communication opening.

(4) In the above-described embodiment, the outer peripheral parts of the multiple boss parts 36 provided in the outer peripheral edge part of the opening part of the gas collection chamber 30 are formed as the convex parts 21 and 35, which protrude inward from each of the bottom surface and the ceiling surface of the gas collection chamber 30 for facilitating the mixing. However, it is possible to omit or change such a convex part for facilitating the mixing, as appropriate. For example, a convex part may be arranged at a position suitable for facilitating the mixing, regardless of a boss part 36.

(5) In the first mixture region 30A of the above-described embodiment, the mixture gas M flows along the flowing direction FM, which is the cylinder alignment direction that intersects with the direction of the central axis A7a of the first communication opening 7a, and the second mixture region is a region positioned further in the back of the communication region 30B along the flowing direction FM of the mixture gas M in the first mixture region 30A. However, the intersecting angle of the flowing direction FM of the mixture gas M in the first mixture region 30A relative to the direction of the central axis A7a of the first communication opening 7a can be changed as appropriate in such a range that properly prevents most of the mixture gas M that has arrived in the communication region 30B from the first mixture region 30A from directly flowing out from the first communication opening 7a.

(6) In the above-described embodiment, the first mixture region 30A is configured such that the EGR gas R introduced from the EGR gas inlet 32a flows along the flowing direction FM of the mixture gas M, and the fresh air introduced from the air inlet 31a is merged with the EGR gas R along the direction FA, which is orthogonal to the flowing direction FM of the mixture gas M. However, the mixing situation of the EGR gas R and the air A in the first mixture region 30A may be changed as appropriate.

INDUSTRIAL APPLICABILITY

The present invention can be applied to a multi-cylinder engine in which exhaust gas is partially recirculated as EGR gas for fresh air taken into multiple cylinders.

DESCRIPTION OF REFERENCE NUMERALS 2 cylinder head
2a side surface part
2b side surface part
3 collector
3a mounting surface part
7 separation plate
7a first communication opening
7b second communication opening
10 cylinder
12 intake port
20 fresh air distribution chamber
21 convex part
25 fresh air distribution opening
30 gas collection chamber
30A first mixture region
30B communication region
30C second mixture region
31a air inlet
32a EGR gas inlet
A air
E exhaust gas
M mixture gas
R EGR gas

The invention claimed is:
1. A multi-cylinder engine intake structure in which exhaust gas is partially recirculated as EGR gas for fresh air taken into a plurality of cylinders, the multi-cylinder engine intake structure comprising:

a fresh air distribution chamber in which a plurality of fresh air distribution openings are open, the plurality of fresh air distribution openings communicating with individual intake ports of the plurality of cylinders; and a gas collection chamber in which an air inlet for introducing air, an EGR gas inlet for introducing the EGR gas, and a first communication opening that communicates with the fresh air distribution chamber are open, wherein the first communication opening is located on a downstream side relative to a flowing direction of mixture gas of the fresh air and the EGR gas, and located in a middle of the gas collection chamber relative to a flowing direction, and the air inlet is located on the downstream side relative to the EGR gas inlet.

2. The multi-cylinder engine intake structure according to claim 1, wherein the fresh air distribution chamber is an internal space in a concave shape formed in a side surface part of a cylinder head, wherein the gas collection chamber is an internal space of a collector mounted to the side surface part of the cylinder head, in a state so as to cover an opening part of the fresh air distribution chamber, and wherein the multi-cylinder engine intake structure comprises a separation plate in which the first communication opening is formed, the separation plate being intermediately mounted between the side surface part of the cylinder head and a mounting surface part of the collector to separate the fresh air distribution chamber and the gas collection chamber from each other.

3. The multi-cylinder engine intake structure according to claim 1, wherein the fresh air distribution chamber is an internal space in a concave shape formed in a side surface part of a cylinder head, wherein the gas collection chamber is an internal space of a collector mounted to the side surface part of the cylinder head, in a state so as to cover an opening part of the fresh air distribution chamber, wherein a plurality of boss parts, to which bolts for mounting are inserted, are provided in a mounting part of the collector for the side surface part of the cylinder head, and wherein outer peripheral parts of the plurality of boss parts are configured as convex parts formed on an inner wall surface of the gas collection chamber for facilitating mixing.

4. The multi-cylinder engine intake structure according to claim 1 comprising:

a second communication opening formed to have a diameter smaller than the first communication opening and configured to allow the second mixture region of the gas collection chamber and the fresh air distribution chamber to communicate with each other.

5. The multi-cylinder engine intake structure according to claim 1, wherein the first mixture region is a region in which the mixture gas flows along a direction intersecting with a direction of a central axis of the first communication opening, and wherein the second mixture region is a region located further in a back of the communication region along the flowing direction of the mixture gas in the first mixture region.

6. The multi-cylinder engine intake structure according to claim 1, wherein the first mixture region is a region in which the EGR gas introduced from the EGR gas inlet flows along the flowing direction of the mixture gas and in which the fresh air introduced from the air inlet is merged with the EGR gas flowing along a direction intersecting with the flowing direction of the mixture gas.

7. The multi-cylinder engine intake structure according to claim 1, wherein the first communication opening located in a middle of the gas collection chamber forms another flowing direction of mixture gas that arrives to a most downstream side of the gas collection chamber and returns toward the first communication opening.

* * * * *